United States Patent
Wu et al.

(10) Patent No.: US 10,849,041 B2
(45) Date of Patent: Nov. 24, 2020

(54) RELAY SELECTION OR RESELECTION METHOD AND APPARATUS AND SYSTEM

(71) Applicant: FUJITSU LIMITED, Kawasaki (JP)

(72) Inventors: Lianhai Wu, Beijing (CN); Haibo Xu, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 60 days.

(21) Appl. No.: 15/810,996

(22) Filed: Nov. 13, 2017

(65) Prior Publication Data
US 2018/0070281 A1 Mar. 8, 2018

Related U.S. Application Data

(63) Continuation of application No. PCT/CN2015/078961, filed on May 14, 2015.

(51) Int. Cl.
*H04W 36/30* (2009.01)
*H04W 88/04* (2009.01)
(Continued)

(52) U.S. Cl.
CPC ........ *H04W 36/30* (2013.01); *H04B 7/15507* (2013.01); *H04B 7/2606* (2013.01);
(Continued)

(58) Field of Classification Search
CPC ..... H04W 8/005; H04W 76/14; H04W 92/18; H04W 4/70; H04W 88/04;
(Continued)

(56) References Cited

U.S. PATENT DOCUMENTS

| | | | | |
|---|---|---|---|---|
| 2010/0329216 A1* | 12/2010 | Jen | ........................ | H04B 7/2606 370/332 |
| 2011/0242970 A1* | 10/2011 | Prakash | ................ | H04W 76/38 370/225 |

(Continued)

FOREIGN PATENT DOCUMENTS

| | | |
|---|---|---|
| CN | 102469410 A | 5/2012 |
| CN | 104144521 A | 11/2014 |
| WO | 2010/071711 A1 | 6/2010 |

OTHER PUBLICATIONS

International Search Report issued for corresponding International Patent Application No. PCT/CN2015/078961, dated Feb. 19, 2016, with an English translation.
(Continued)

*Primary Examiner* — Natasha W Cosme
(74) *Attorney, Agent, or Firm* — Myers Wolin, LLC.

(57) ABSTRACT

Embodiments of this disclosure provide a relay reselection method and apparatus and a system; includes: relay equipment monitors a triggering condition for relay reselection; the relay equipment judges whether the triggering condition for relay reselection is met; and the relay equipment transmits relay reselection indication information to a remote terminal taking the relay equipment as a relay when the triggering condition for relay reselection is met, to indicate the remote terminal to perform relay reselection; wherein, the triggering condition for relay reselection is that an air interface channel of the relay equipment is out of synchronization or is about to be out of synchronization, or a notification of terminating a relay function is received, or power of the relay equipment is insufficient. With the embodiments of this disclosure, a time of interruption due to a poor relay link may be reduced, and occurrence of long-time traffic interruption may be avoided.

16 Claims, 8 Drawing Sheets

(51) Int. Cl.
| | |
|---|---|
| H04B 7/26 | (2006.01) |
| H04W 48/20 | (2009.01) |
| H04B 7/155 | (2006.01) |
| H04W 36/00 | (2009.01) |
| H04W 36/36 | (2009.01) |
| H04W 84/04 | (2009.01) |
| H04W 72/04 | (2009.01) |

(52) U.S. Cl.
CPC ....... *H04W 36/0005* (2013.01); *H04W 36/36* (2013.01); *H04W 48/20* (2013.01); *H04W 88/04* (2013.01); *H04W 72/0406* (2013.01); *H04W 84/047* (2013.01)

(58) Field of Classification Search
CPC ........... H04W 72/0406; H04W 72/048; H04W 76/27; H04W 24/10; H04W 48/08; H04W 72/02; H04W 8/00; H04W 48/14; H04W 48/16; H04W 72/04; H04W 72/042; H04W 84/042; H04W 88/02; H04W 48/12; H04W 48/20; H04L 1/08; H04L 1/1812; H04L 1/1825; H04L 1/1864; H04L 1/1887; H04L 47/14; H04L 47/30; H04L 5/00; H04L 5/001; H04L 5/0028; H04L 5/0032; H04L 5/0035; H04L 5/0048; H04L 5/0053; H04L 5/0055; H04L 5/0057; H04L 5/0092; H04L 5/0094; H04L 67/16

USPC ........................................................ 370/329
See application file for complete search history.

(56) References Cited

U.S. PATENT DOCUMENTS

| | | | |
|---|---|---|---|
| 2013/0217395 A1* | 8/2013 | Suzuki | H04W 36/0088 455/437 |
| 2013/0303171 A1 | 11/2013 | Jang et al. | |
| 2015/0045033 A1 | 2/2015 | Kim et al. | |
| 2018/0092017 A1* | 3/2018 | Freda | H04W 76/14 |

OTHER PUBLICATIONS

Written Opinion of the International Searching Authority issued for corresponding International Patent Application No. PCT/CN2015/078961, dated Feb. 19, 2016, with an English translation.

First Office Action and search report dated Jul. 13, 2020 for counterpart Chinese patent application No. 201580079112.3 along with the English translation.

Search report issued by the China National Intellectual Property Administration for corresponding Chinese patent application No. 201580079112.3, dated Jul. 13, 2020.

ETRI, "Discussion on Relaying for D2D Proximity Services", 3GPP TSG-RAN WG2 Meeting #83 R2-132592, Agenda Item 7.5.2, Aug. 19-23, 2013, Barcelona, Spain.

* cited by examiner

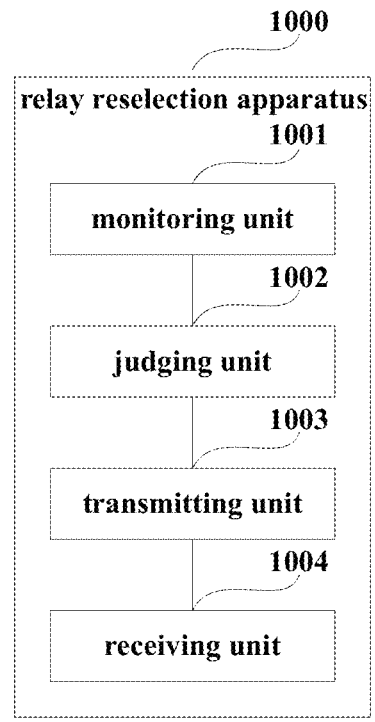
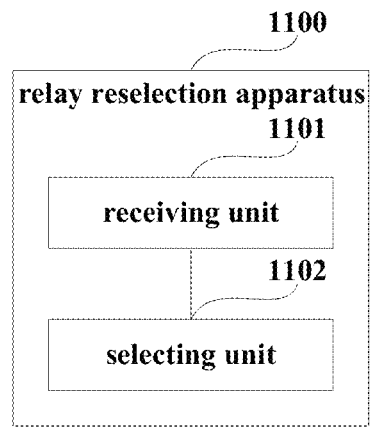
Fig. 10        Fig. 11
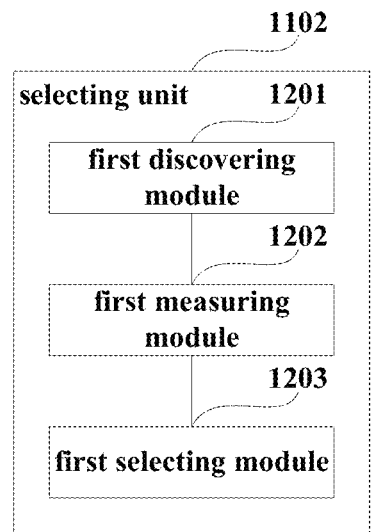
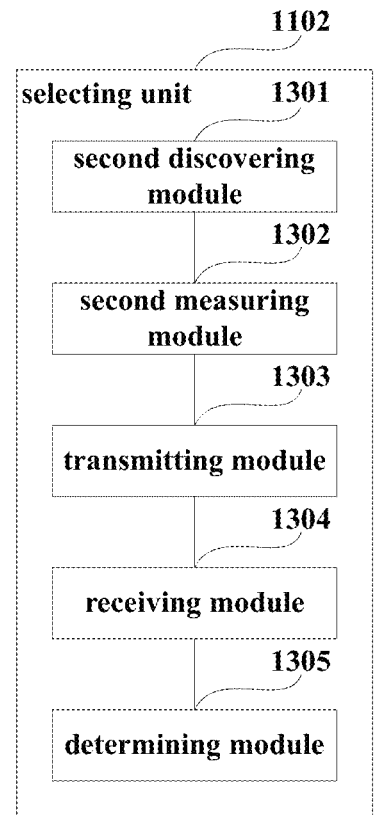
Fig. 12        Fig. 13

US 10,849,041 B2

RELAY SELECTION OR RESELECTION METHOD AND APPARATUS AND SYSTEM

CROSS REFERENCE TO RELATED APPLICATIONS

This application is a continuation application of International Application PCT/CN2015/078961 filed on May 14, 2015, the entire contents of which are incorporated herein by reference.

FIELD

This disclosure relates to the field of communications technologies, and in particular to a relay selection or reselection method and apparatus and a system.

BACKGROUND

A sidelink communications mode refers to that a packet needs not to pass a core network and an eNB, and a communications link may be directly established between user equipment 1 (UE1) and user equipment 2 (UE2) for communications. And a sidelink discovery process is generally performed before performing sidelink communications. For example, the UE2 needs first to discover whether the UE1 is near before transmitting information to the UE1 via the sidelink communications mode. FIG. 1 is a schematic diagram of discovery or sidelink communications establishment when two UEs are both under coverage of an eNB. FIG. 2 is a schematic diagram of discovery or sidelink communications establishment when one UE is under coverage of an eNB and another UE is not under the coverage of the eNB. And FIG. 3 is a schematic diagram of discovery or sidelink communications establishment when two UEs are both not under coverage of an eNB.

The sidelink communications mode may be used to expand coverage of a cell. As shown in FIG. 1, the UE2 is located at an edge of a cell, and its signals are relatively weak, which is very possible to leave the coverage of the cell. Furthermore, there exists a terminal nearby which is authorized by a network and has a function of relay, referred to as a relay, such as the UE1. And in order to avoid traffic interruption, the UE2 may access to an eNB via the relay UE1 after discovering the relay UE1, and proceed with performing normal traffic communications. As shown in FIG. 2, the UE2 is located in an area with no network coverage, and there exists a terminal nearby which is authorized by a network and has a function of relay, such as the UE1. And in order to access to a network for communications, the UE2 may access to an eNB via the relay UE1 within coverage of the cell after discovering the relay UE1, and proceed with performing normal traffic communications.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In the above description of scenarios, the UE2 is referred to as remote terminal (noted as remote UE), which is possibly located within coverage of a cell, or may be located out of coverage of a cell. The terminal having a function of relay, such as the UE1, is referred to as a relay between a terminal and a network (noted as UE-network relay), and briefly referred to as a relay in this application.

When the remote terminal accesses to an eNB via the relay for communications, a radio link failure possibly occurs in the relay within coverage of the cell. Once the radio link failure occurs in the relay, traffic interruption will occur in all remote terminals needing the relay, until another appropriate relay is selected.

In order to reduce a time of interruption due to a poor relay link and avoid occurrence of long-time traffic interruption, embodiments of this disclosure provide a relay selection or reselection method and apparatus and a system.

According to a first aspect of the embodiments of this disclosure, there is provided a relay reselection apparatus, applicable to relay equipment, the apparatus including:

a monitoring unit configured to monitor a triggering condition for notifying a remote terminal to perform relay reselection;

a judging unit configured to judge whether the triggering condition for notifying a remote terminal to perform relay reselection is met; and a transmitting unit configured to transmit relay reselection indication information to the remote terminal taking the relay equipment as a relay when the triggering condition for notifying a remote terminal to perform relay reselection is met, to trigger the remote terminal to perform relay reselection;

wherein, the triggering condition for notifying a remote terminal to perform relay reselection is that a T310 timer starts or a T310 timer is running or a T310 timer expires, or a notification of terminating a relay function is received, or power of the relay equipment is insufficient.

According to a second aspect of the embodiments of this disclosure, there is provided a relay reselection apparatus, applicable to a remote terminal, the apparatus including:

a receiving unit configured to receive relay reselection indication information; and a selecting unit configured to trigger relay reselection after the receiving unit receives the relay reselection indication information.

According to a third aspect of the embodiments of this disclosure, there is provided a relay reselection apparatus, applicable to an eNB, the apparatus including:

a receiving unit configured to receive a channel measurement result of a sidelink channel between a remote terminal and each relay equipment and a relay identifier of each relay equipment, transmitted by the remote terminal;

a selecting unit configured to select relay equipment for the remote terminal according to the channel measurement result and the relay identifier; and a transmitting unit configured to notify the remote terminal of the selected relay equipment;

wherein, the relay identifiers of the relay equipment include: a Cell-Radio Network Temporary Identifier (C-RNTI), a Sidelink-Radio Network Temporary Identifier (SL-RNTI), or a relay identifier for a sidelink (ProSe relay UE ID).

According to a fourth aspect of the embodiments of this disclosure, there is provided a relay reselection method, applicable to relay equipment, the method including:

monitoring a triggering condition for notifying a remote terminal to perform relay reselection;

judging whether the triggering condition for notifying a remote terminal to perform relay reselection is met; and transmitting relay reselection indication information to the remote terminal taking the relay equipment as a relay when the triggering condition for notifying a remote terminal to perform relay reselection is met, to trigger the remote terminal to perform relay reselection;

wherein, the triggering condition for notifying a remote terminal to perform relay reselection is that a T310 timer starts or a T310 timer is running or a T310 timer expires, or a notification of terminating a relay function is received, or power of the relay equipment is insufficient.

According to a fifth aspect of the embodiments of this disclosure, there is provided a relay reselection method, applicable to a remote terminal, the method including:

receiving relay reselection indication information; and triggering relay reselection after the relay reselection indication information is received.

According to a sixth aspect of the embodiments of this disclosure, there is provided a relay reselection method, applicable to an eNB, the method including:

receiving a channel measurement result of a sidelink channel between a remote terminal and each relay equipment and a relay identifier of each relay equipment, transmitted by the remote terminal;

selecting relay equipment for the remote terminal according to the channel measurement result and the relay identifier; and notifying the remote terminal of the selected relay equipment;

wherein, the relay identifiers of the relay equipment include: a Cell-Radio Network Temporary Identifier (C-RNTI), a Sidelink-Radio Network Temporary Identifier (SL-RNTI), or a relay identifier for a sidelink (ProSe relay UE ID).

According to a seventh aspect of the embodiments of this disclosure, there is provided relay equipment, including the apparatus as described in the first aspect.

According to an eighth aspect of the embodiments of this disclosure, there is provided a remote terminal, including the apparatus as described in the second aspect.

According to a ninth aspect of the embodiments of this disclosure, there is provided an eNB, including the apparatus as described in the third aspect.

According to a tenth aspect of the embodiments of this disclosure, there is provided a communications system, including the relay equipment as described in the seventh aspect, the remote terminal as described in the eighth aspect and the eNB as described in the ninth aspect.

An advantage of the embodiments of this disclosure exists in that with the embodiments of this disclosure, a time of interruption due to a poor relay link may be reduced, and occurrence of long-time traffic interruption may be avoided.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 10 is a schematic diagram of a structure of a relay reselection apparatus of Embodiment 4;

FIG. 11 is a schematic diagram of a structure of a relay reselection apparatus of Embodiment 5;

FIG. 12 is a schematic diagram of a structure of one implementation of a selecting unit of the relay reselection apparatus in FIG. 11;

FIG. 13 is a schematic diagram of a structure of another implementation of a selecting unit of the relay reselection apparatus in FIG. 11;

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings. These embodiments are illustrative only, and are not intended to limit this disclosure.

Embodiment 1

Figure 1:
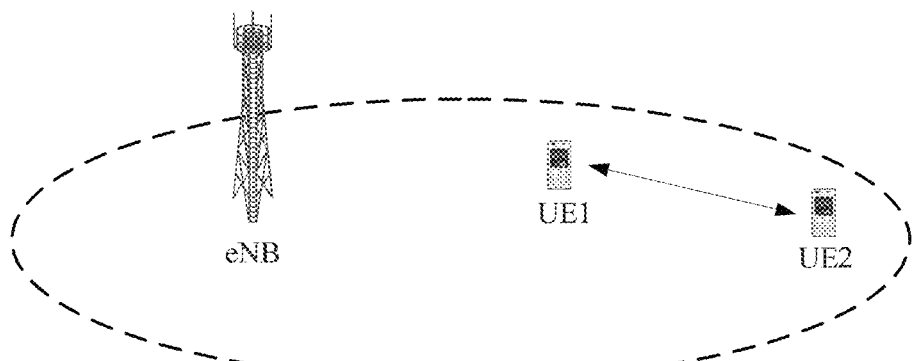
FIG. 1 is a schematic diagram of a scenario of discovery or sidelink establishment.
Figure 2:
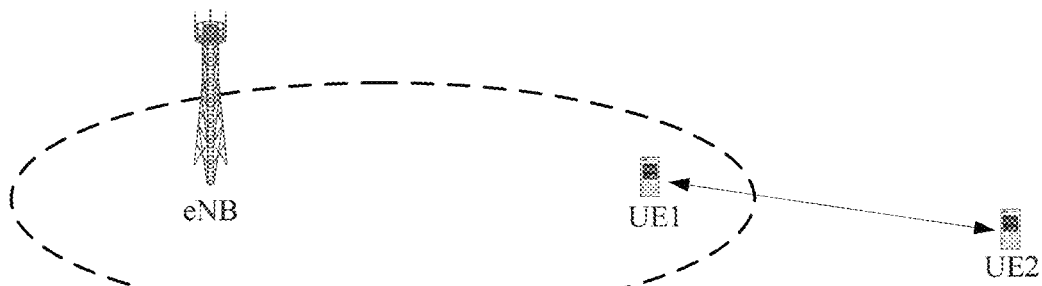
FIG. 2 is a schematic diagram of another scenario of discovery or sidelink establishment.
Figure 3:
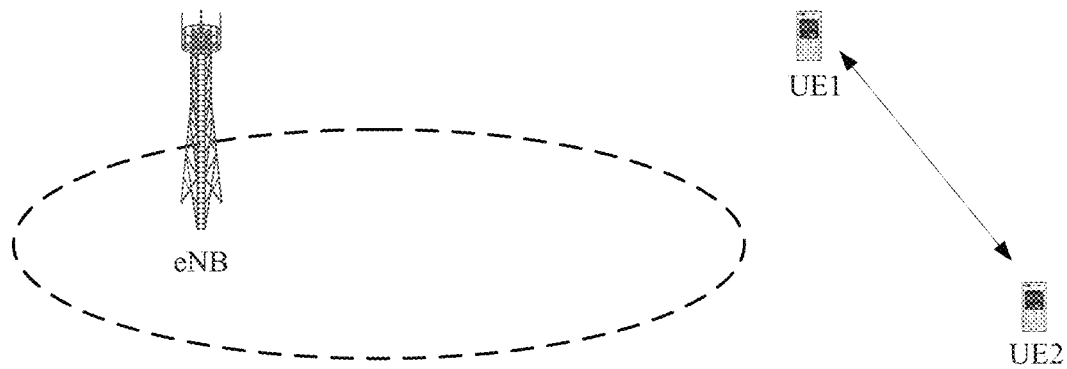
FIG. 3 is a schematic diagram of a further scenario of discovery or sidelink establishment.
Figure 4:
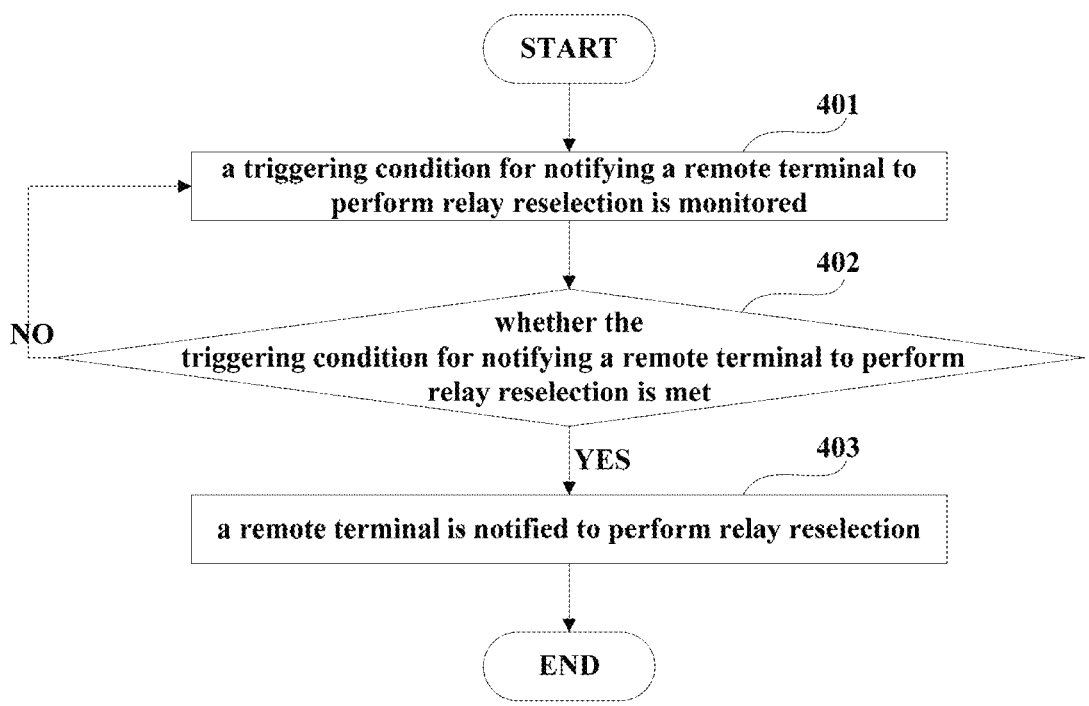
FIG. 4 is a flowchart of a relay reselection method of Embodiment 1.

The embodiment of this disclosure provides a relay reselection method, applicable to relay equipment, such as terminal equipment within coverage of a cell. In the embodiment, the terminal equipment is selected as a relay by a remote terminal in a discovery manner, and functions as relay equipment of the remote terminal. FIG. 4 is a flowchart of the method. Referring to FIG. 4, the method includes:

step 401: the terminal equipment monitors a triggering condition for notifying a remote terminal to perform relay reselection;

step 402: the terminal equipment judges whether the triggering condition for notifying a remote terminal to perform relay reselection is met, step 403 is executed if the condition is met, otherwise, step 401 is executed; and step 403: the terminal equipment transmits relay reselection indication information to a remote terminal taking the relay equipment as a relay, so as to trigger the remote terminal to perform relay reselection.

In one implementation of this embodiment, the triggering condition for notifying a remote terminal to perform relay reselection may be that an air interface channel of the relay equipment is in asynchronization or is about to be in asynchronization. In this implementation, when the relay equipment detects that a problem occurs in a physical layer of a primary cell (PCell), for example, the relay equipment receives a successive asynchronization indication of N310 times (a threshold configured by a network), a T310 timer is started, which will expire after a period of time of operation. Hence, if the T310 timer is started, or the T310 timer is running, or the T310 timer expires, it shows that the air interface channel of the relay equipment is in asynchronization or is about to be in asynchronization, which will possibly result in that traffic interruption occurs in the remote terminal taking the relay equipment as the relay. Thus, in this implementation, once the relay equipment monitors that the T310 timer is started, or the T310 timer is running, or the T310 timer expires, that is, the triggering condition for notifying a remote terminal to perform relay reselection is met, it transmits the relay reselection indication information to the remote terminal taking the relay equipment as a relay, so as to trigger the remote terminal to perform relay reselection. And the relay reselection indication information may be discovery information containing temporary interruption of a relay air interface.

In another implementation of this embodiment, the triggering condition for notifying a remote terminal to perform relay reselection may be that the relay equipment receives a notification of terminating a relay function. In this implementation, a network side, such as an eNB, may possibly notify the relay equipment to terminate a relay function, and once the relay equipment in this embodiment receives the notification from the network side, it will deem that the triggering condition for notifying a remote terminal to perform relay reselection is met, and transmit the relay reselection indication information to the remote terminal taking the relay equipment as a relay, so as to trigger the remote terminal to perform relay reselection. And the relay reselection indication information may be discovery information containing indication information on temporary termination of a relay function.

In a further implementation of this embodiment, the triggering condition for notifying a remote terminal to perform relay reselection may be that power of the relay equipment is insufficient. As power insufficiency possibly results in poweroff, traffic interruption may be caused to occur in the remote terminal taking the relay equipment as a relay. Hence, in this implementation, the relay equipment may further monitor battery power of itself, and once it is found that its battery power is insufficient, it will deem that the triggering condition for notifying a remote terminal to perform relay reselection is met, and transmit the relay reselection indication information to the remote terminal taking the relay equipment as a relay, so as to trigger the remote terminal to perform relay reselection. And the relay reselection indication information may be discovery information containing indication information on power insufficiency.

The triggering conditions for notifying a remote terminal to perform relay reselection in the above implementations are illustrative only, and this embodiment is not limited thereto.

With the method of this embodiment, when the triggering condition for notifying a remote terminal to perform relay reselection is met, the relay equipment triggers the remote terminal to perform relay reselection, thereby avoiding traffic interruption of the remote terminal due to occurrence of a link failure in the relay equipment.

In one implementation of this embodiment, the relay reselection indication information may be transmitted by the above relay equipment to the remote terminal via sidelink transmission. In this implementation, the relay reselection indication information may include: a relay identifier of the relay equipment, and air interface connection being interrupted temporarily and/or a relay function of a serving cell being terminated and/or power of the relay equipment being insufficient, etc. In this implementation, the relay identifier of the relay equipment is used to inform the remote terminal that the relay equipment cannot be taken as a relay, and the relay identifier of the relay equipment may include: a Cell-Radio Network Temporary Identifier (C-RNTI), a Sidelink-Radio Network Temporary Identifier (SL-RNTI), or a relay identifier for a sidelink (ProSe relay UE ID), etc. And in this implementation, the air interface connection being interrupted temporarily and/or the relay function of a serving cell being terminated and/or the power of the relay equipment being insufficient etc., are used for informing the remote terminal of a cause of a failure.

In another implementation of this embodiment, the relay reselection indication information may be transmitted by the above relay equipment to the eNB via an air interface, and forwarded by the eNB to the above remote terminal. In this implementation, the relay reselection indication information may include: a terminal identifier of the remote terminal, and air interface connection being about to be interrupted and/or power of the relay equipment being insufficient, etc. In this implementation, the terminal identifier of the remote terminal is used to inform the eNB of the remote terminal taking the above relay equipment as a relay. The terminal identifier of the remote terminal may include: a Cell-Radio Network Temporary Identifier (C-RNTI), a Sidelink-Radio Network Temporary Identifier (SL-RNTI), or a terminal identifier for a sidelink (ProSe UE ID), etc. In this implementation, the air interface connection being about to be interrupted and/or power of the relay equipment being insufficient is/are used to inform the eNB of a cause of a failure. In this implementation, alternatively, the relay reselection indication information may further include a relay identifier of the relay equipment, so as to inform the eNB that which of relay equipment cannot be taken as a relay of the above remote terminal. In this implementation, when transmission resources allocated by the eNB to the relay equipment are determined, the relay identifier of the relay equipment may not be included, and the eNB may determine the relay equipment according to a position receiving the above information. In this implementation, after receiving the relay reselection indication information, the eNB may notify the information to the remote terminal, so as to trigger the remote terminal to perform relay reselection. In this implementation, notifying the information to the remote terminal is also optional, and the eNB may also trigger in other manners the remote terminal to perform relay reselection.

In this embodiment, in order to perform relay discovery, the relay equipment may further receive a terminal identifier of the remote terminal broadcasted by the remote terminal via the sidelink transmission, and transmit a relay identifier of itself to the remote terminal via sidelink transmission; or, the relay equipment broadcasts the relay identifier of itself via the sidelink transmission, so that the remote terminal receiving the relay identifier takes the relay equipment as a candidate relay of the remote terminal. In this embodiment, the relay identifier of the relay equipment and the terminal identifier of the remote terminal have been described above, and shall not be described herein any further.

With the method of this embodiment, traffic interruption of the remote terminal due to occurrence of a link failure in the relay equipment may be avoided.

Embodiment 2

Figure 5:
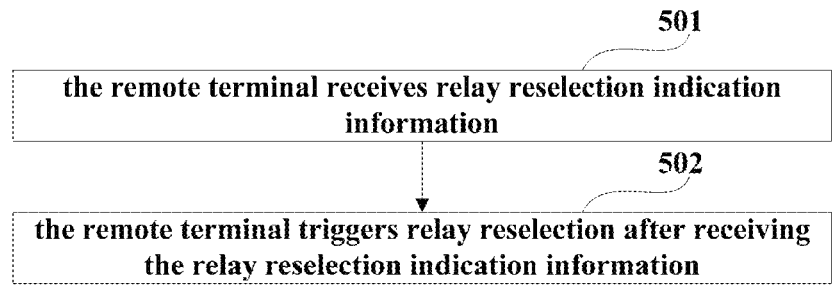
FIG. 5 is a flowchart of a relay reselection method of Embodiment 2.

The embodiment of this disclosure provides a relay reselection method, which is applicable to a remote terminal, and is processing at a remote terminal side corresponding to the method in Embodiment 1, with contents identical to those in Embodiment 1 being not going to be described herein any further. The remote terminal may be within coverage of a cell, or may be out of coverage of a cell, and may discover a relay via sidelink transmission. FIG. 5 is a flowchart of the method. Referring to FIG. 5, the method includes:

step 501: the remote terminal receives relay reselection indication information; and step 502: the remote terminal triggers relay reselection after receiving the relay reselection indication information.

In step 501, the remote terminal may receive the relay reselection indication information transmitted by relay equipment via sidelink transmission, the relay reselection indication information being contained in discovery information transmitted by the relay equipment. And the remote terminal may also receive the relay reselection indication information transmitted by an eNB via an air interface (dedicated signaling), with details being as describe above, the contents of which being incorporated herein, and being not going to be described herein any further. Once the above relay reselection indication information is received, the remote terminal is triggered to perform relay reselection.

Figure 6:
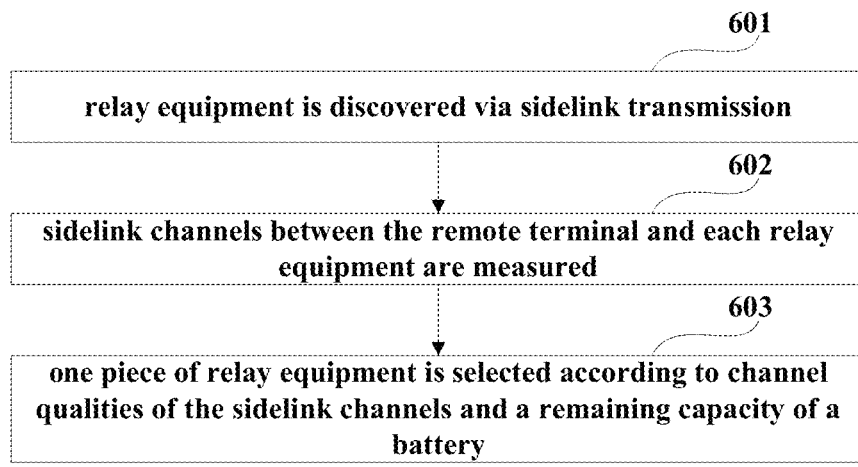
FIG. 6 is a flowchart of one implementation of performing relay reselection by a remote terminal.

In one implementation of step 502, for a remote terminal with no coverage of a cell, or for a remote terminal within coverage of a cell, relay reselection may be performed by using a method shown in FIG. 6. Referring to FIG. 6, the method includes:

step 601: relay equipment is discovered via sidelink transmission;

step 602: sidelink channels between the remote terminal and each relay equipment are measured; and step 603: one relay equipment is selected according to channel qualities of the sidelink channels and a remaining capacity of a battery.

In step 601, the discovery of relay equipment may be achieved by using a conventional discovery mechanism, and may also be achieved by using a discovery mechanism in this embodiment, which shall be described below.

In one implementation, as described above, the relay equipment broadcasts a relay identifier of itself via the sidelink transmission, and the remote terminal of this embodiment receives relay identifiers of the relay equipment broadcasted by the relay equipment via sidelink transmission, so as to discover the relay equipment.

In another implementation, as described above, the remote terminal broadcasts a terminal identifier of itself via the sidelink transmission, and receives relay identifiers of the relay equipment transmitted by the relay equipment via sidelink transmission, so as to discover the relay equipment.

In this implementation, the relay identifiers of the relay equipment and the terminal identifier of the remote terminal have been described in detail in Embodiment 1, and shall not be described herein any further. In this embodiment, the relay identifiers of the relay equipment and the terminal identifier of the remote terminal may be transmitted via conventional discovery information. Other contents contained in the discovery information than the above identifiers are not limited in this embodiment. For example, the discovery information may further include a public land mobile network ID (PLMN ID), and an access point name (APN), etc.

In step 602, the remote terminal measures channel quality of the sidelink channel between it and each relay equipment, with a particular measurement method being not limited.

In step 603, the remote terminal may select one relay equipment as a relay of itself according to the measured channel qualities of the sidelink channels and the remaining capacity of a battery of itself.

Figure 7:
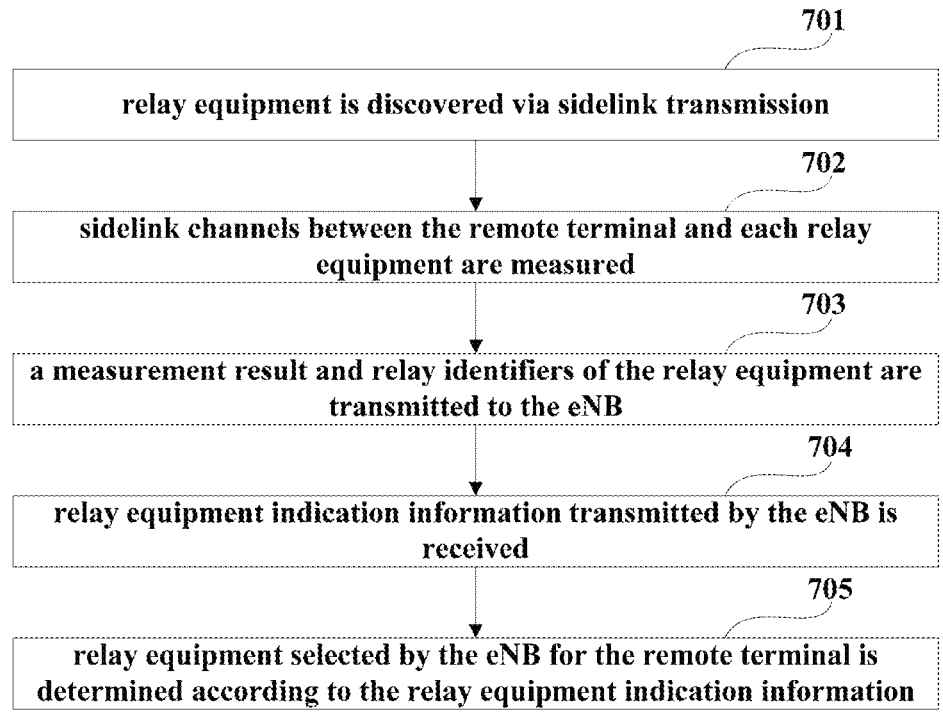
FIG. 7 is a flowchart of another implementation of performing relay reselection by a remote terminal.

In another implementation of step 502, for a remote terminal within coverage of a cell, relay reselection may be performed by using a method shown in FIG. 7. Referring to FIG. 7, the method includes:

step 701: relay equipment is discovered via sidelink transmission;

step 702: sidelink channels between the remote terminal and each relay equipment are measured;

step 703: a measurement result and relay identifiers of the relay equipment are transmitted to the eNB;

step 704: relay equipment indication information transmitted by the eNB is received; and step 705: relay equipment selected by the eNB for the remote terminal is determined according to the relay equipment indication information.

Steps 701-702 are identical to steps 601-602 in the implementation shown in FIG. 6, the contents of which being incorporated herein, which shall not be described herein any further.

In step 703, the remote terminal transmits the measurement result and the relay identifiers of the relay equipment to the eNB, and the eNB selects an appropriate relay for the remote terminal. In this step, the relay identifiers of the relay equipment are as described above.

In step 704, the remote terminal may receive the relay equipment indication information fed back by the eNB, and the eNB may transmit the information to the remote terminal via dedicated signaling.

In step 705, the remote terminal may, according to the received indication information fed back by the eNB, determine the relay equipment selected by the eNB for it.

In this embodiment, a process of performing relay reselection by the remote terminal is described with reference to FIGS. 6 and 7. In a particular process of implementation, the remote terminal may perform relay selection by using the methods shown in FIGS. 6 and 7. And a particular process of implementation is as described above, and shall not be described herein any further.

In this embodiment, after successfully selecting a new relay, the remote terminal may transmit a request for connection establishment to the selected relay, so as to establish connection with the relay. And thereafter, the remote terminal may release a link with a previous relay after successfully accessing to the new relay.

With the method of this embodiment, when the relay equipment of the remote terminal is unable to be used as a relay of the remote terminal, the remote terminal may reselect an appropriate relay, thereby avoiding traffic interruption due to a link failure in the previous relay.

Embodiment 3

Figure 8:
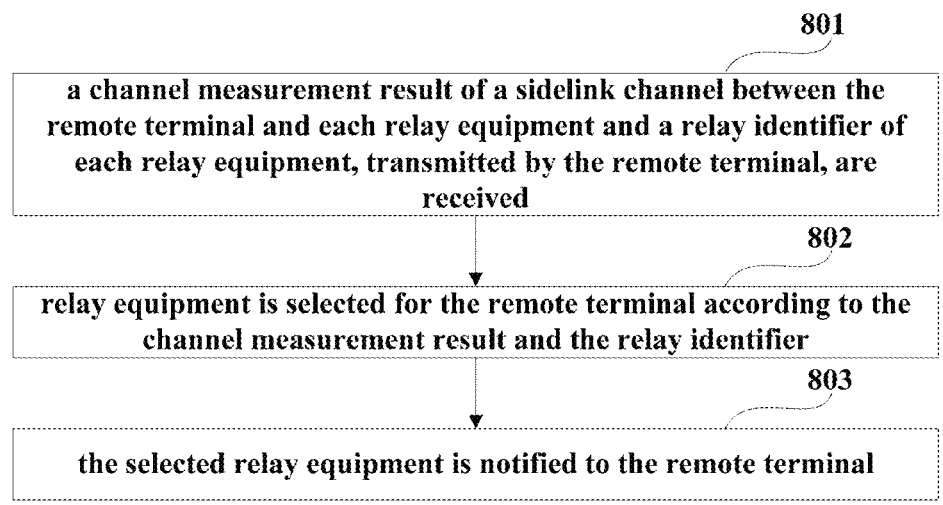
FIG. 8 is a flowchart of a relay reselection method of Embodiment 3.

The embodiment of this disclosure provides a relay reselection method, which is applicable to an eNB, and is processing at an eNB side corresponding to the methods in embodiments 1 and 2, with contents identical to those in embodiments 1 and 2 being not going to be described herein any further. FIG. 8 is a flowchart of the method. Referring to FIG. 8, the method includes:

step 801: a channel measurement result of a sidelink channel between the remote terminal and each relay equipment and a relay identifier of each relay equipment, transmitted by the remote terminal, are received;

step 802: relay equipment is selected for the remote terminal according to the channel measurement result and the relay identifier; and step 803: the selected relay equipment is notified to the remote terminal.

In this embodiment, after receiving the above channel measurement results and the relay identifiers of the relay equipment transmitted by the remote terminal, the eNB selects appropriate relay equipment for the remote terminal accordingly and notifies the remote terminal, thereby assisting the remote terminal in performing relay reselection, and avoiding traffic interruption due to a link failure in a previous relay.

In step 801, the remote terminal may transmit the above channel measurement results and relay identifiers via a previous relay.

In step 802, the eNB may select appropriate relay equipment for the remote terminal according to the channel measurement results of the sidelink channels between the remote terminal and each relay equipment, with a particular policy for selection being not limited in this embodiment.

In step 803, alternatively, the eNB may, via dedicated signaling, notify the remote terminal of the relay equipment selected for it; however, this embodiment is not limited thereto.

In this embodiment, as described above, the eNB may further assist the relay equipment in indicating the remote terminal to perform relay reselection, hence, the eNB may further receive relay reselection indication information transmitted by the relay equipment, and transmit the relay reselection indication information to the remote terminal, so as to indicate the remote terminal to perform relay reselection, the relay reselection indication information including: air interface connection being temporarily interrupted and/or power of the relay equipment being insufficient, and a terminal identifier of the remote terminal. In this embodiment, the relay reselection indication information may further include a relay identifier of the relay equipment, so that the eNB identify the relay equipment. Furthermore, the relay reselection indication information may be transmitted to the remote terminal by the eNB via dedicated signaling.

In this embodiment, as described above, the eNB may further indicate the relay equipment to terminate a relay function, hence, the eNB may further transmit indication information for terminating a relay function to the relay equipment, so as to indicate the relay equipment to terminate a relay function. In this embodiment, the eNB may transmit the above information via RRC signaling, or may transmit the information via other signaling.

In this embodiment, the relay identifiers of the relay equipment and the terminal identifier of the remote terminal have been described in detail in Embodiment 1, and shall not be described herein any further.

With the method of this embodiment, the eNB may assist the relay equipment in indicating the remote terminal to perform relay reselection, and assist the remote terminal in reselecting a relay, thereby avoiding traffic interruption due to a link failure in a relay.

Figure 9:
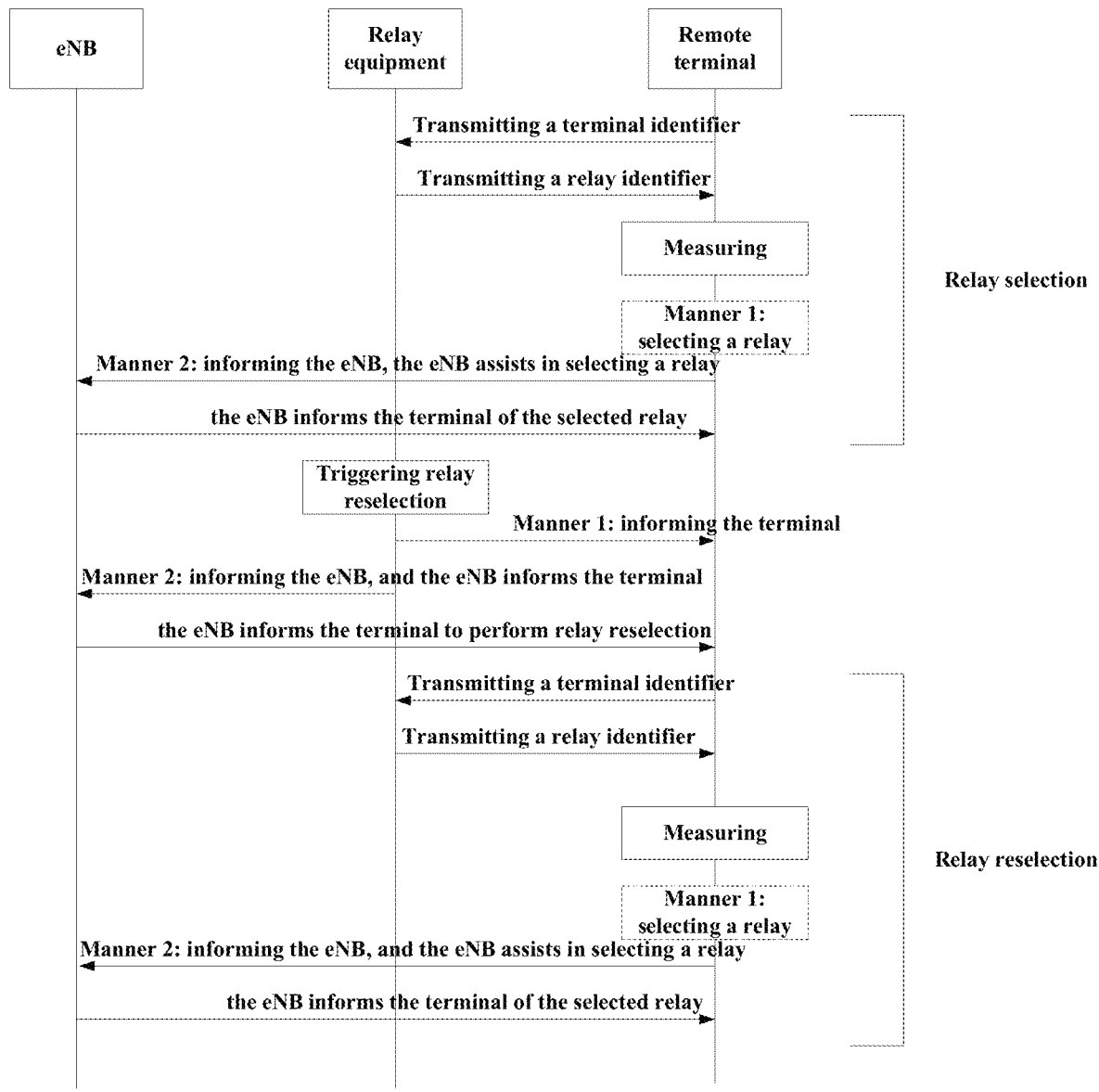
FIG. 9 is a schematic diagram of information exchange in the relay reselection method of this embodiment.

FIG. 9 is a schematic diagram of information exchange in the relay reselection method of this embodiment. And respective processing of the eNB, the relay equipment and the remote terminal may be seen from FIG. 9.

Embodiment 4

The embodiment of this disclosure provides a relay reselection apparatus, configured in relay equipment, such as terminal equipment within coverage of a cell, which is selected as a relay by a remote terminal. As principles of the apparatus for solving problems are similar to that of the method of Embodiment 1, the implementation of the method of Embodiment 1 may be referred to for implementation of the apparatus, with identical contents being not going to be described herein any further.

FIG. 10 is a schematic diagram of a structure of the relay reselection apparatus. Referring to FIG. 10, the apparatus 1000 includes a monitoring unit 1001, a judging unit 1002 and a transmitting unit 1003; wherein, the monitoring unit 1001 is configured to monitor a triggering condition for notifying a remote terminal to perform relay reselection;

the judging unit 1002 is configured to judge whether the triggering condition for notifying a remote terminal to perform relay reselection is met;

and the transmitting unit 1003 is configured to transmit relay reselection indication information to the remote terminal taking the relay equipment as a relay when the triggering condition for notifying a remote terminal to perform relay reselection is met, so as to trigger the remote terminal to perform relay reselection;

wherein, the triggering condition for notifying a remote terminal to perform relay reselection is that that an air interface channel of the relay equipment is in asynchronization or is about to be in asynchronization, or a notification of terminating a relay function is received, or power of the relay equipment is insufficient.

In one implementation, the transmitting unit 1003 may transmit the relay reselection indication information to the remote terminal via sidelink transmission, so as to indicate the remote terminal to perform relay reselection; wherein, the relay reselection indication information includes: a relay identifier of the relay equipment, and air interface connection being interrupted temporarily and/or a relay function of a serving cell being terminated and/or power of the relay equipment being insufficient. In this implementation, the relay identifier of the relay equipment includes: a Cell-Radio Network Temporary Identifier (C-RNTI), a Sidelink-Radio Network Temporary Identifier (SL-RNTI), or a relay identifier for a sidelink (ProSe relay UE ID).

In one implementation, the transmitting unit 1003 may transmit the relay reselection indication information to an eNB via an air interface, so as to indicate the eNB to notify the remote terminal to perform relay reselection; wherein, the relay reselection indication information includes: a terminal identifier of the remote terminal, and air interface connection being about to be interrupted and/or power of the relay equipment being insufficient. In this implementation, the terminal identifier of the remote terminal includes: a Cell-Radio Network Temporary Identifier (C-RNTI), a Sidelink-Radio Network Temporary Identifier (SL-RNTI), or a terminal identifier for a sidelink (ProSe UE ID). Alternatively, the relay reselection indication information further includes: a relay identifier of the relay equipment, which including: a Cell-Radio Network Temporary Identifier (C-RNTI), a Sidelink-Radio Network Temporary Identifier (SL-RNTI), or a relay identifier for a sidelink (ProSe relay UE ID).

In one implementation, the apparatus may further include: a receiving unit 1004 configured to receive a terminal identifier of the remote terminal broadcasted by the remote terminal via the sidelink transmission; wherein, the terminal identifier of the remote terminal includes: a Cell-Radio Network Temporary Identifier (C-RNTI), a Sidelink-Radio Network Temporary Identifier (SL-RNTI), or a terminal identifier for a sidelink (ProSe UE ID). In this implementation, the transmitting unit 1003 is further configured to transmit a relay identifier of the relay equipment to the remote terminal via sidelink transmission, so that the remote terminal is able to discover the relay equipment; wherein, the relay identifier of the relay equipment includes: a Cell-Radio Network Temporary Identifier (C-RNTI), a Sidelink-Radio Network Temporary Identifier (SL-RNTI), or a relay identifier for a sidelink (ProSe relay UE ID).

In one implementation, the transmitting unit 1003 is further configured to broadcast the relay identifier of the relay equipment via the sidelink transmission, so that the remote terminal is able to discover the relay equipment; wherein, the relay identifier of the relay equipment includes: a Cell-Radio Network Temporary Identifier (C-RNTI), a Sidelink-Radio Network Temporary Identifier (SL-RNTI), or a relay identifier for a sidelink (ProSe relay UE ID).

With the apparatus of this embodiment, by transmitting the relay reselection indication information, the relay equipment may trigger the remote terminal to perform relay reselection, thereby avoiding traffic interruption due to a link failure in a relay.

Embodiment 5

The embodiment of this disclosure provides a relay reselection apparatus, applicable to a remote terminal. The remote terminal may be within coverage of a cell, or may be out of coverage of a cell. As principles of the apparatus for solving problems are similar to that of the method of Embodiment 2, the implementation of the method of Embodiment 2 may be referred to for implementation of the apparatus, with identical contents being not going to be described herein any further.

FIG. 11 is a schematic diagram of a structure of the relay reselection apparatus. Referring to FIG. 11, the apparatus 1100 includes a receiving unit 1101 and a selecting unit 1102; wherein, the receiving unit 1101 is configured to receive relay reselection indication information;

and the selecting unit 1102 is configured to trigger relay reselection after the receiving unit 1101 receives the relay reselection indication information.

In one implementation, the receiving unit 1101 may receive the relay reselection indication information transmitted by relay equipment via sidelink transmission, the relay reselection indication information may be contained in discovery information for transmission. In this implementation, the relay reselection indication information includes: a relay identifier of the relay equipment, and air interface connection being interrupted temporarily and/or a relay function of a serving cell being terminated and/or power of the relay equipment being insufficient. In this implementation, the relay identifier of the relay equipment includes: a Cell-Radio Network Temporary Identifier (C-RNTI), a Sidelink-Radio Network Temporary Identifier (SL-RNTI), or a relay identifier for a sidelink (ProSe relay UE ID).

In another implementation, the receiving unit 1101 may receive the relay reselection indication information transmitted by an eNB via an air interface, the relay reselection indication information may be transmitted via dedicated signaling. In this implementation, the relay reselection indication information includes: a terminal identifier of the remote terminal, and air interface connection being about to be interrupted and/or power of the relay equipment being insufficient. In this implementation, the terminal identifier of the remote terminal includes: a Cell-Radio Network Temporary Identifier (C-RNTI), a Sidelink-Radio Network Temporary Identifier (SL-RNTI), or a terminal identifier for a sidelink (ProSe UE ID). Alternatively, the relay reselection indication information may further include: a relay identifier of the relay equipment, which including: a Cell-Radio Network Temporary Identifier (C-RNTI), a Sidelink-Radio Network Temporary Identifier (SL-RNTI), or a relay identifier for a sidelink (ProSe relay UE ID).

In one implementation, as shown in FIG. 12, the selecting unit 1102 may include: a first discovering module 1201, a first measuring module 1202 and a first selecting module 1203. In this implementation, the first discovering module 1201 is configured to discover relay equipment via sidelink transmission, the first measuring module 1202 is configured to measure a sidelink channel between the remote terminal and each relay equipment, and the first selecting module 1203 is configured to select one relay equipment according to channel qualities of the sidelink channels and a remaining capacity of a battery.

In this implementation, the first discovering module 1201 may discover the relay equipment by receiving a relay identifier of the relay equipment broadcasted by the relay equipment via the sidelink transmission. In this implementation, the relay identifier of the relay equipment is: a Cell-Radio Network Temporary Identifier (C-RNTI), a Sidelink-Radio Network Temporary Identifier (SL-RNTI), or a relay identifier for a sidelink (ProSe relay UE ID).

In this implementation, the first discovering module 1201 may also broadcast a terminal identifier of the remote terminal via the sidelink transmission, and receive a relay identifier of the relay equipment transmitted by the relay equipment via the sidelink transmission, so as to discover the relay equipment. In this implementation, the terminal identifier of the remote terminal is: a Cell-Radio Network Temporary Identifier (C-RNTI), a Sidelink-Radio Network Temporary Identifier (SL-RNTI), or a terminal identifier for a sidelink (ProSe UE ID). In this implementation, the relay identifier of the relay equipment is: a Cell-Radio Network Temporary Identifier (C-RNTI), a Sidelink-Radio Network Temporary Identifier (SL-RNTI), or a relay identifier for a sidelink (ProSe relay UE ID).

In another implementation, as shown in FIG. 13, the selecting unit 1102 may include: a second discovering module 1301, a second measuring module 1302, a transmitting module 1303, a receiving module 1304 and a determining module 1305. In this implementation, the second discovering module 1301 is configured to discover relay equipment via sidelink transmission, the second measuring module 1302 is configured to measure a sidelink channel between the remote terminal and each relay equipment, the transmitting module 1303 is configured to transmit a measurement result and a relay identifier of each relay equipment to an eNB, the receiving module 1304 is configured to receive relay equipment indication information transmitted by the eNB, and the determining module 1305 is configured to, according to the relay equipment indication information, determine relay equipment selected by the eNB for the remote terminal.

In this implementation, the second discovering module 1301 may receive a relay identifier of the relay equipment broadcasted by the relay equipment via the sidelink transmission, so as to discover the relay equipment. In this implementation, the relay identifier of the relay equipment is: a Cell-Radio Network Temporary Identifier (C-RNTI), a Sidelink-Radio Network Temporary Identifier (SL-RNTI), or a relay identifier for a sidelink (ProSe relay UE ID).

In this implementation, the second discovering module 1302 may also broadcast a terminal identifier of the remote terminal via the sidelink transmission, and receive a relay identifier of the relay equipment transmitted by the relay equipment via the sidelink transmission, so as to discover the relay equipment. In this implementation, the terminal identifier of the remote terminal is: a Cell-Radio Network Temporary Identifier (C-RNTI), a Sidelink-Radio Network Temporary Identifier (SL-RNTI), or a terminal identifier for a sidelink (ProSe UE ID). And wherein, the relay identifier of the relay equipment is: a Cell-Radio Network Temporary Identifier (C-RNTI), a Sidelink-Radio Network Temporary Identifier (SL-RNTI), or a relay identifier for a sidelink (ProSe relay UE ID).

With the apparatus of this embodiment, the remote terminal may trigger relay reselection according to the relay reselection indication information, thereby avoiding traffic interruption due to a link failure in a relay.

Embodiment 6

The embodiment of this disclosure provides a relay reselection apparatus, applicable to an eNB. As principles of the apparatus for solving problems are similar to that of the method of Embodiment 3, the implementation of the method of Embodiment 3 may be referred to for implementation of the apparatus, with identical contents being not going to be described herein any further.

Figure 14:
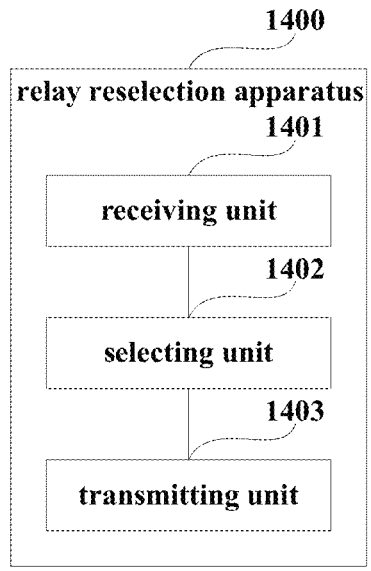
FIG. 14 is a schematic diagram of a structure of a relay reselection apparatus of Embodiment 6.

FIG. 14 is a schematic diagram of a structure of the relay reselection apparatus. Referring to FIG. 14, the apparatus 1400 includes: a receiving unit 1401, a selecting unit 1402 and a transmitting unit 1403; wherein, the receiving unit 1401 is configured to receive a channel measurement result of a sidelink channel between the remote terminal and each relay equipment and a relay identifier of each relay equipment, transmitted by the remote terminal;

the selecting unit 1402 is configured to select relay equipment for the remote terminal according to the channel measurement result and the relay identifier;

and the transmitting unit 1403 is configured to notify the remote terminal of the selected relay equipment.

In this embodiment, the relay identifiers of the relay equipment include: a Cell-Radio Network Temporary Identifier (C-RNTI), a Sidelink-Radio Network Temporary Identifier (SL-RNTI), or a relay identifier for a sidelink (ProSe relay UE ID).

In one implementation of this embodiment, the receiving unit 1401 may further be configured to receive relay reselection indication information transmitted by the relay equipment, the relay reselection indication information including: air interface connection being about to be interrupted and/or power of the relay equipment being insufficient, and a terminal identifier of the remote terminal. And the transmitting unit 1403 is further configured to transmit the relay reselection indication information to the remote terminal, so as to trigger the remote terminal to perform relay reselection. In this implementation, the terminal identifier of the remote terminal includes: a Cell-Radio Network Temporary Identifier (C-RNTI), a Sidelink-Radio Network Temporary Identifier (SL-RNTI), or a terminal identifier for a sidelink (ProSe UE ID). Alternatively, the relay reselection indication information further includes: a relay identifier of the relay equipment.

In one implementation of this embodiment, the transmitting unit 1403 is further configured to transmit indication information for terminating a relay function to the relay equipment, so as to indicate the relay equipment to terminate the relay function.

With the apparatus of this embodiment, the eNB may assist the relay equipment in triggering the remote terminal to perform relay reselection, and assist the remote terminal in reselecting a relay, thereby avoiding traffic interruption due to a link failure in a relay.

Embodiment 7

The embodiment of this disclosure provides relay equipment, which may be terminal equipment (such as UE) within coverage of a cell. In this embodiment, the relay equipment may include the relay reselection apparatus described in Embodiment 4.

Figure 15:
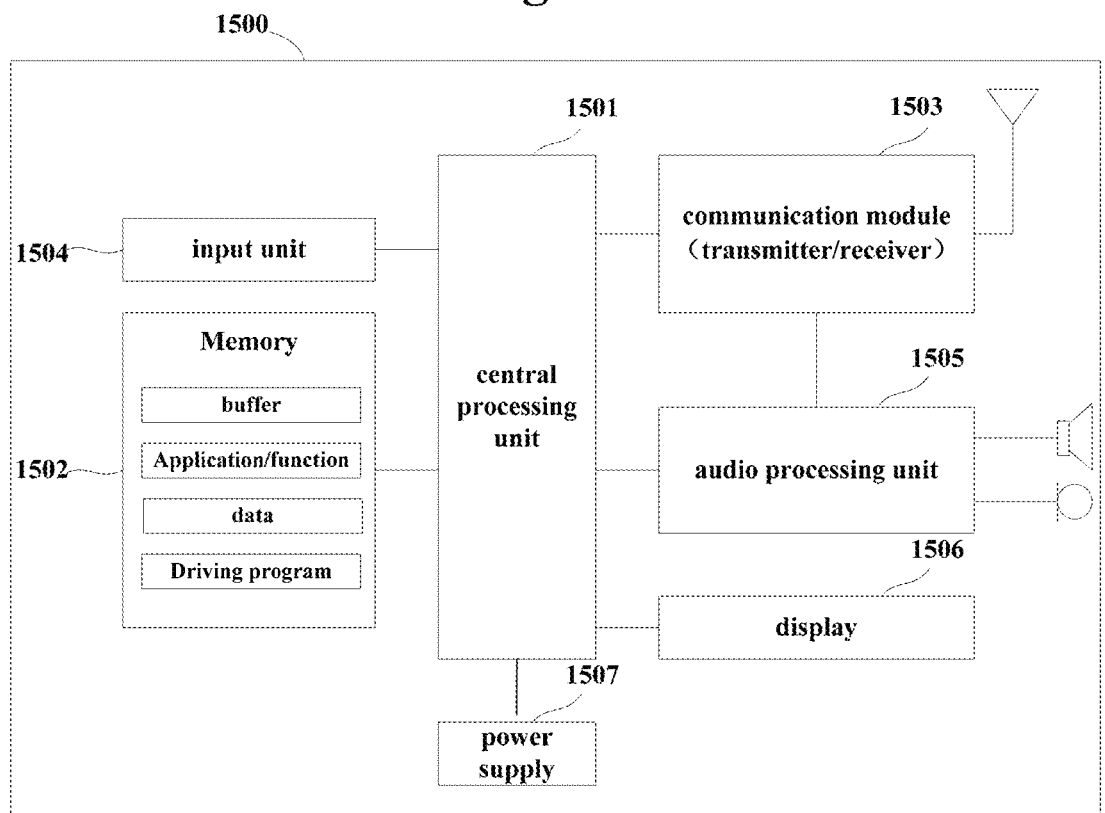
FIG. 15 is a schematic diagram of a structure of a relay equipment of Embodiment 7.

FIG. 15 is a schematic diagram of a structure of the relay equipment of the embodiment of this disclosure. As shown in FIG. 15, the relay equipment 1500 may include a central processing unit 1501 and a memory 1502, the memory 1502 being coupled to the central processing unit 1501. It should be noted that this figure is illustrative only, and other types of structures may also be used, so as to supplement or replace this structure and achieve a telecommunications function or other functions.

In one implementation, the functions of the relay reselection apparatus may be integrated into the central processing unit 1501, and the functions of the relay reselection apparatus described in Embodiment 4 are executed by the central processing unit 1501, the functions of the relay reselection apparatus being incorporated herein, and being not going to be described herein any further.

In another implementation, the relay reselection apparatus and the central processing unit 1501 may be configured separately. For example, the relay reselection apparatus may be configured as a chip connected to the central processing unit 1501, with its functions being realized under control of the central processing unit 1501.

As shown in FIG. 15, the relay equipment 1500 may further include a communications module 1503, an input unit 1504, an audio processing unit 1505, a display 1506 and a power supply 1507. It should be noted that the relay equipment 1500 does not necessarily include all the parts shown in FIG. 15, and furthermore, the relay equipment 1500 may include parts not shown in FIG. 15, and the related art may be referred to.

As shown in FIG. 15, the central processing unit 1501 is sometimes referred to as a controller or an operation control, and may include a microprocessor or other processor devices and/or logic devices. The central processing unit 1501 receives input and controls operations of every components of the relay equipment 1500.

In this embodiment, the memory 1502 may be, for example, one or more of a buffer memory, a flash memory, a hard drive, a mobile medium, a volatile memory, a nonvolatile memory, or other suitable devices, which may store information, and may further store a program executing related information. And the central processing unit 1501 may execute the program stored in the memory 1502, so as to realize information storage or processing, etc. Functions of other parts are similar to those of the related art, which shall not be described herein any further. The parts of the relay equipment 1500 may be realized by specific hardware, firmware, software, or any combination thereof, without departing from the scope of the present disclosure.

With the relay equipment of this embodiment, the remote terminal may be triggered to perform relay reselection, thereby avoiding traffic interruption due to a link failure in a relay.

Embodiment 8

The embodiment of this disclosure provides a remote terminal, which may be within coverage of a cell, or may be out of coverage of a cell. In this embodiment, the remote terminal may include the relay reselection apparatus described in Embodiment 5.

Figure 16:
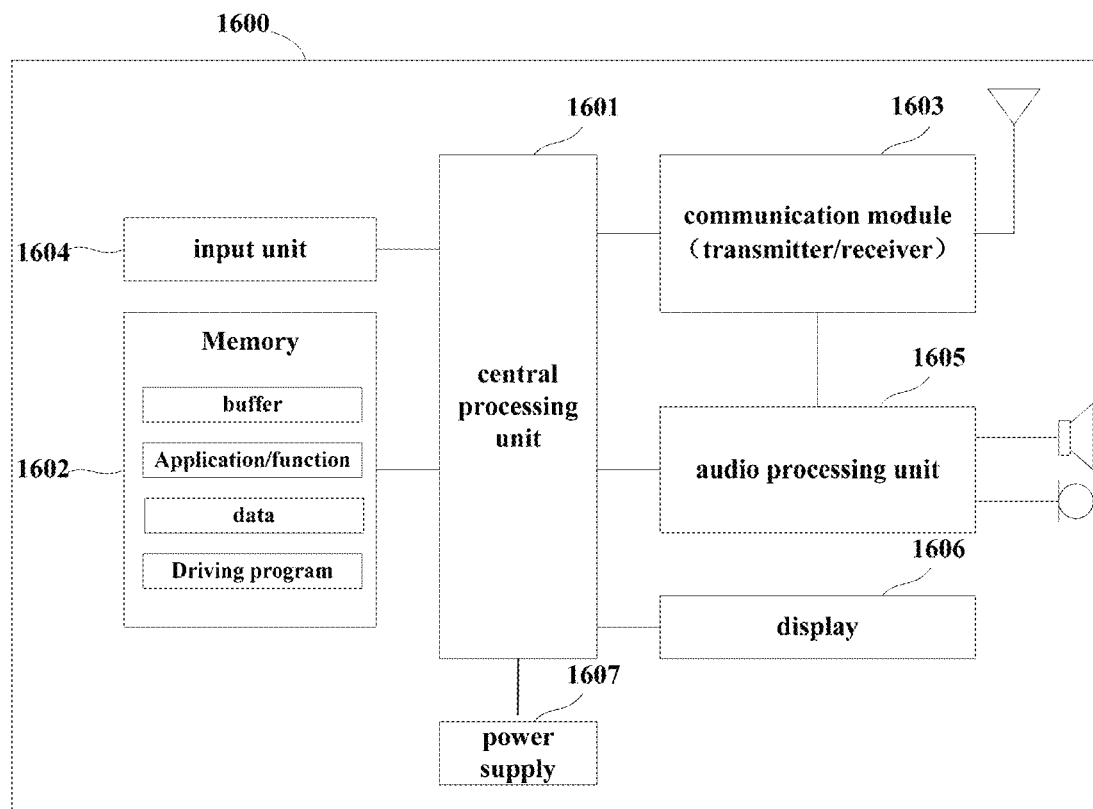
FIG. 16 is a schematic diagram of a structure of a remote terminal of Embodiment 8.

FIG. 16 is a schematic diagram of a structure of the remote terminal of the embodiment of this disclosure. As shown in FIG. 16, a remote terminal 1600 may include a central processing unit 1601 and a memory 1602, the memory 1602 being coupled to the central processing unit 1601. It should be noted that this figure is illustrative only, and other types of structures may also be used, so as to supplement or replace this structure and achieve a telecommunications function or other functions.

In one implementation, the functions of the relay reselection apparatus may be integrated into the central processing unit 1601, and the functions of the relay reselection apparatus described in Embodiment 5 are executed by the central processing unit 1601, the functions of the relay reselection apparatus being incorporated herein, and being not going to be described herein any further.

In another implementation, the relay reselection apparatus and the central processing unit 1601 may be configured separately. For example, the relay reselection apparatus may be configured as a chip connected to the central processing unit 1601, with its functions being realized under control of the central processing unit 1601.

As shown in FIG. 16, the remote terminal 1600 may further include a communications module 1603, an input unit 1604, an audio processing unit 1605, a display 1606 and a power supply 1607. It should be noted that the remote terminal 1600 does not necessarily include all the parts shown in FIG. 16, and furthermore, the remote terminal 1600 may include parts not shown in FIG. 16, and the related art may be referred to.

As shown in FIG. 16, the central processing unit 1601 is sometimes referred to as a controller or an operation control, and may include a microprocessor or other processor devices and/or logic devices. The central processing unit 1601 receives input and controls operations of every components of the remote terminal 1600.

In this embodiment, the memory 1602 may be, for example, one or more of a buffer memory, a flash memory, a hard drive, a mobile medium, a volatile memory, a nonvolatile memory, or other suitable devices, which may store information, and may further store a program executing related information. And the central processing unit 1601 may execute the program stored in the memory 1602, so as to realize information storage or processing, etc. Functions of other parts are similar to those of the related art, which shall not be described herein any further. The parts of the remote terminal 1600 may be realized by specific hardware, firmware, software, or any combination thereof, without departing from the scope of the present disclosure.

With the remote terminal of this embodiment, relay reselection may be triggered according to relay reselection indication information, thereby avoiding traffic interruption due to a link failure in a relay.

Embodiment 9

The embodiment of this disclosure provides an eNB, including the relay reselection apparatus described in Embodiment 6.

Figure 17:
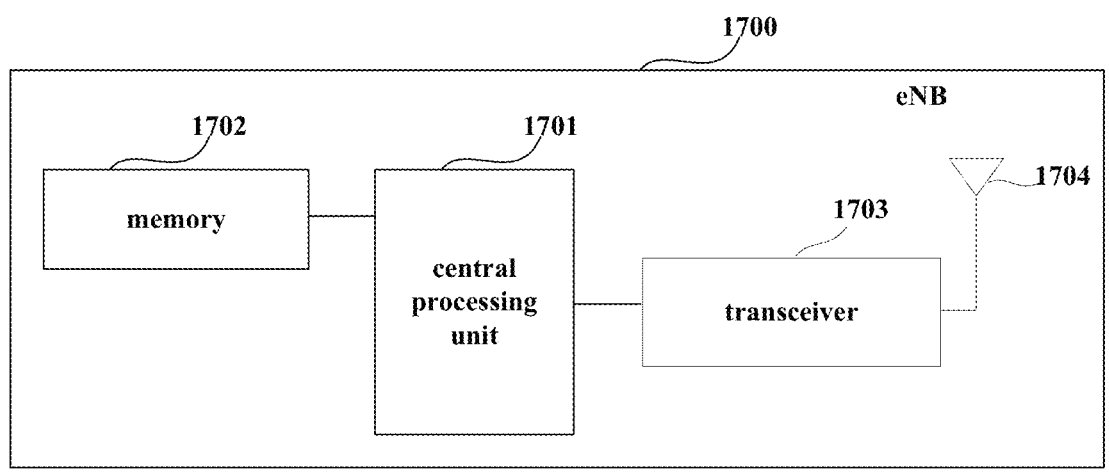
FIG. 17 is a schematic diagram of a structure of an eNB of Embodiment 9.

FIG. 17 is a schematic diagram of a structure of the eNB of the embodiment of this disclosure. As shown in FIG. 17, the eNB 1700 may include a central processing unit (CPU) 1701 and a memory 1702, the memory 1702 being coupled to the central processing unit 1701. In this embodiment, the memory 1702 may store various data, and furthermore, it may store a program for information processing, and execute the program under control of the central processing unit 1701, so as to receive various information transmitted by relay equipment or a remote terminal, and transmit various information to the relay equipment or the remote terminal.

In one implementation, the functions of the relay reselection apparatus may be integrated into the central processing unit 1701.

In another implementation, the relay reselection apparatus and the central processing unit 1701 may be configured separately. For example, the relay reselection apparatus may be configured as a chip connected to the central processing unit 1701, with its functions being realized under control of the central processing unit 1701.

Furthermore, as shown in FIG. 17, the eNB 1700 may include a transceiver 1703, and an antenna 1704, etc. In this embodiment, functions of the above components are similar to those in the related art, and shall not be described herein any further. It should be noted that the eNB 1700 does not necessarily include all the parts shown in FIG. 17, and furthermore, the eNB 1700 may include parts not shown in FIG. 17, and the related art may be referred to.

With the eNB of this embodiment, the relay equipment may be assisted in triggering the remote terminal to perform relay reselection, and the remote terminal may be assisted in reselecting a relay, thereby avoiding traffic interruption due to a link failure in a relay.

Embodiment 10

The embodiment of this disclosure further provides a communications system, including the relay equipment described in Embodiment 7, the remote terminal described in Embodiment 8 and the eNB described in Embodiment 9.

Figure 18:
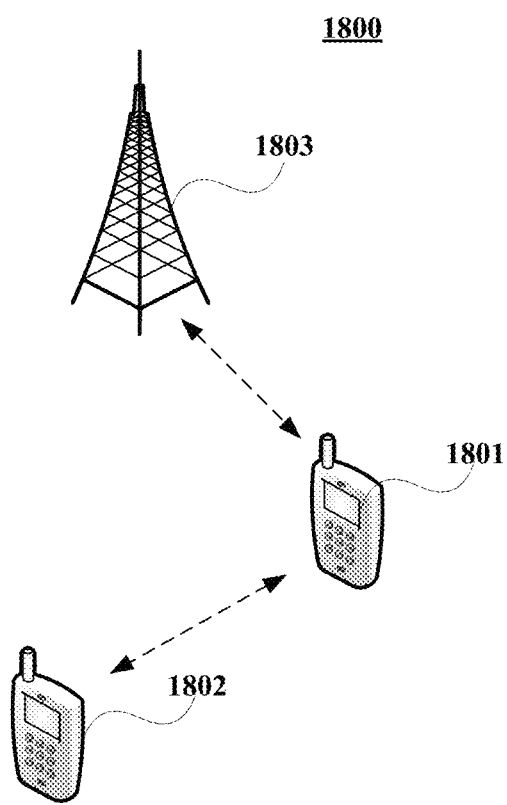
FIG. 18 is a schematic diagram of topology of a communications system of Embodiment 10.

FIG. 18 is a schematic diagram of a structure of the communications system of the embodiment of this disclosure. As shown in FIG. 18, a communications system 1800 includes relay equipment 1801, a remote terminal 1802 and an eNB 1803; wherein, the number of pieces of the relay equipment 1801 may be one or more, and the relay equipment 1801 may be within coverage of the eNB 1803, and may be achieved by the relay equipment in Embodiment 7, the contents of which being incorporated herein, and being not going to be described herein any further;

the number of the remote terminal 1802 may be one or more, and the remote terminal 1802 may be within coverage of the eNB 1803, or may be out of the coverage of the eNB 1803, and may be achieved by the remote terminal in Embodiment 8, the contents of which being incorporated herein, and being not going to be described herein any further;

and the eNB 1803 may be achieved by the eNB in Embodiment 9, the contents of which being incorporated herein, and being not going to be described herein any further.

With the communications system of this embodiment, the remote terminal may reselect an appropriate relay in case of a link failure in a relay, thereby avoiding traffic interruption due to a link failure in a relay.

An embodiment of the present disclosure provides a computer readable program code, which, when executed in a relay reselection apparatus or relay equipment, will cause a computer unit to carry out the relay reselection method described in Embodiment 1 in the relay reselection apparatus or the relay equipment.

An embodiment of the present disclosure provides a computer readable medium, including a computer readable program code, which will cause a computer unit to carry out the relay reselection method described in Embodiment 1 in a relay reselection apparatus or relay equipment.

An embodiment of the present disclosure provides a computer readable program code, which, when executed in a relay reselection apparatus or a remote terminal, will cause a computer unit to carry out the relay reselection method described in Embodiment 2 in the relay reselection apparatus or the remote terminal.

An embodiment of the present disclosure provides a computer readable medium, including a computer readable program code, which will cause a computer unit to carry out the relay reselection method described in Embodiment 2 in the relay reselection apparatus or the remote terminal.

An embodiment of the present disclosure provides a computer readable program code, which, when executed in a relay reselection apparatus or an eNB, will cause a computer unit to carry out the relay reselection method described in Embodiment 3 in the relay reselection apparatus or the eNB.

An embodiment of the present disclosure provides a computer readable medium, including a computer readable program code, which will cause a computer unit to carry out the relay reselection method described in Embodiment 3 in a relay reselection apparatus or an eNB.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A relay reselection apparatus, applicable to relay equipment, the apparatus comprising:
    a monitoring unit configured to monitor a triggering condition for notifying a remote terminal to perform relay reselection;
    a judging unit configured to judge whether the triggering condition for notifying a remote terminal to perform relay reselection is met; and
    a transmitting unit configured to transmit relay reselection indication information to the remote terminal taking the relay equipment as a relay when the triggering condition for notifying a remote terminal to perform relay reselection is met, to trigger the remote terminal to perform relay reselection;
    wherein, the triggering condition for notifying a remote terminal to perform relay reselection is receiving out-of-synchronization or a notification of terminating a relay function is received.

2. The apparatus according to claim 1, wherein the transmitting unit transmits the relay reselection indication information to the remote terminal via sidelink transmission, to indicate the remote terminal to perform relay reselection;
    wherein, the relay reselection indication information comprises: a relay identifier of the relay equipment, and air interface connection being interrupted temporarily and/or a relay function of a serving cell being terminated;
    and wherein, the relay identifier of the relay equipment comprises: a Cell-Radio Network Temporary Identifier (C-RNTI), a Sidelink-Radio Network Temporary Identifier (SL-RNTI), or a relay identifier for a sidelink (ProSe relay UE ID).

3. The apparatus according to claim 1, wherein the transmitting unit transmits the relay reselection indication information to an eNB via an air interface, to indicate the eNB to notify the remote terminal to perform relay reselection;
    wherein, the relay reselection indication information comprises: a terminal identifier of the remote terminal, and air interface connection being about to be interrupted;
    and wherein, the terminal identifier of the remote terminal comprises: a Cell-Radio Network Temporary Identifier (C-RNTI), a Sidelink-Radio Network Temporary Identifier (SL-RNTI), or a terminal identifier for a sidelink (ProSe UE ID).

4. The apparatus according to claim 3, wherein the relay reselection indication information further comprises: a relay identifier of the relay equipment comprising a Cell-Radio Network Temporary Identifier (C-RNTI), a Sidelink-Radio Network Temporary Identifier (SL-RNTI), or a relay identifier for a sidelink (ProSe relay UE ID).

5. The apparatus according to claim 1, wherein the apparatus further comprises:
a receiving unit configured to receive a terminal identifier of the remote terminal broadcasted by the remote terminal via sidelink transmission;
and the transmitting unit is further configured to transmit a relay identifier of the relay equipment to the remote terminal via sidelink transmission;
wherein, the relay identifier of the relay equipment comprises: a Cell-Radio Network Temporary Identifier (C-RNTI), a Sidelink-Radio Network Temporary Identifier (SL-RNTI), or a relay identifier for a sidelink (ProSe relay UE ID);
and wherein, the terminal identifier of the remote terminal comprises: a Cell-Radio Network Temporary Identifier (C-RNTI), a Sidelink-Radio Network Temporary Identifier (SL-RNTI), or a terminal identifier for a sidelink (ProSe UE ID).

6. The apparatus according to claim 1, wherein the transmitting unit is further configured to broadcast a relay identifier of the relay equipment via sidelink transmission;
and wherein, the relay identifier of the relay equipment comprises: a Cell-Radio Network Temporary Identifier (C-RNTI), a Sidelink-Radio Network Temporary Identifier (SL-RNTI), or a relay identifier for a sidelink (ProSe relay UE ID).

7. A relay reselection apparatus, applicable to a remote terminal, the apparatus comprising:
a memory that stores a plurality of instructions;
a processor that couples to the memory and is configured to execute the plurality of instructions to:
receive relay reselection indication information when a triggering condition for notifying the remote terminal to perform relay reselection is met; and
trigger relay reselection after receiving the relay reselection indication information, wherein, the triggering condition for notifying a remote terminal to perform relay reselection is receiving out-of-synchronization or a notification of terminating a relay function is received.

8. The relay reselection apparatus according to claim 7, wherein the processor is further configured to receive the relay reselection indication information transmitted by relay equipment via sidelink transmission;
wherein, the relay reselection indication information comprises: a relay identifier of the relay equipment, and air interface connection being interrupted temporarily and/or a relay function of a serving cell being terminated;
and wherein, the relay identifier of the relay equipment comprises: a Cell-Radio Network Temporary Identifier (C-RNTI), a Sidelink-Radio Network Temporary Identifier (SL-RNTI), or a relay identifier for a sidelink (ProSe relay UE ID).

9. The relay reselection apparatus according to claim 7, wherein the processor is further configured to receive the relay reselection indication information transmitted by an eNB via an air interface;
wherein, the relay reselection indication information comprises: a terminal identifier of the remote terminal, and air interface connection being about to be interrupted;
and wherein, the terminal identifier of the remote terminal comprises: a Cell-Radio Network Temporary Identifier (C-RNTI), a Sidelink-Radio Network Temporary Identifier (SL-RNTI), or a terminal identifier for a sidelink (ProSe UE ID).

10. The relay reselection apparatus according to claim 9, wherein the relay reselection indication information further comprises: a relay identifier of relay equipment comprising a Cell-Radio Network Temporary Identifier (C-RNTI), a Sidelink-Radio Network Temporary Identifier (SL-RNTI), or a relay identifier for a sidelink (ProSe relay UE ID).

11. The relay reselection apparatus according to claim 7, wherein the relay reselection apparatus further comprises:
a first discovering module configured to discover relay equipment via sidelink transmission;
a first measuring module configured to measure sidelink channel between the remote terminal and each relay equipment; and
a first selecting module configured to select one relay equipment according to channel qualities of the sidelink channels and a remaining capacity of a battery.

12. The relay reselection apparatus according to claim 11, wherein the first discovering module receives a relay identifier of the relay equipment broadcasted by the relay equipment via the sidelink transmission, to discover the relay equipment;
and wherein, the relay identifier of the relay equipment is: a Cell-Radio Network Temporary Identifier (C-RNTI), a Sidelink-Radio Network Temporary Identifier (SL-RNTI), or a relay identifier for a sidelink (ProSe relay UE ID).

13. The relay reselection apparatus according to claim 11, wherein the first discovering module broadcasts a terminal identifier of the remote terminal via the sidelink transmission, and receives a relay identifier of the relay equipment transmitted by the relay equipment via the sidelink transmission, to discover the relay equipment;
wherein, the terminal identifier of the remote terminal is: a Cell-Radio Network Temporary Identifier (C-RNTI), a Sidelink-Radio Network Temporary Identifier (SL-RNTI), or a terminal identifier for a sidelink (ProSe UE ID);
and wherein, the relay identifier of the relay equipment is: a Cell-Radio Network Temporary Identifier (C-RNTI), a Sidelink-Radio Network Temporary Identifier (SL-RNTI), or a relay identifier for a sidelink (ProSe relay UE ID).

14. The relay reselection apparatus according to claim 7, wherein the relay reselection apparatus further comprises:
a second discovering module configured to discover relay equipment via sidelink transmission;
a second measuring module configured to measure sidelink channel between the remote terminal and each relay equipment;
a transmitting module configured to transmit a measurement result and a relay identifier of each relay equipment to an eNB;
a receiving module configured to receive relay equipment indication information transmitted by the eNB; and
a determining module configured to, according to the relay equipment indication information, determine relay equipment selected by the eNB for the remote terminal.

15. The relay reselection apparatus according to claim 14, wherein the second discovering module receives a relay identifier of the relay equipment broadcasted by the relay equipment via the sidelink transmission, to discover the relay equipment;

wherein, the relay identifier of the relay equipment is: a Cell-Radio Network Temporary Identifier (C-RNTI), a Sidelink-Radio Network Temporary Identifier (SL-RNTI), or a relay identifier for a sidelink (ProSe relay UE ID).

16. The relay reselection apparatus according to claim 14, wherein the second discovering module broadcasts a terminal identifier of the remote terminal via the sidelink transmission, and receives a relay identifier of the relay equipment transmitted by the relay equipment via the sidelink transmission, to discover the relay equipment;

wherein, the terminal identifier of the remote terminal is: a Cell-Radio Network Temporary Identifier (C-RNTI), a Sidelink-Radio Network Temporary Identifier (SL-RNTI), or a terminal identifier for a sidelink (ProSe UE ID);

and wherein, the relay identifier of the relay equipment is: a Cell-Radio Network Temporary Identifier (C-RNTI), a Sidelink-Radio Network Temporary Identifier (SL-RNTI), or a relay identifier for a sidelink (ProSe relay UE ID).

* * * * *